United States Patent [19]

Härtel

[11] Patent Number: 4,766,865

[45] Date of Patent: Aug. 30, 1988

[54] DEVICE FOR DETERMINING THE POSITION OF A CRANKSHAFT IN RELATION TO THE CYLINDER

[75] Inventor: Günter Härtel, Neuss, Fed. Rep. of Germany

[73] Assignee: Pierburg GmbH, Neuss, Fed. Rep. of Germany

[21] Appl. No.: 24,590

[22] Filed: Mar. 11, 1987

[30] Foreign Application Priority Data

Mar. 13, 1986 [DE] Fed. Rep. of Germany ....... 3608321

[51] Int. Cl.$^4$ .......................... F02D 41/00; F02P 9/00
[52] U.S. Cl. ..................................... 123/414; 123/476
[58] Field of Search ............... 123/414, 416, 417, 476; 73/117.3, 119 R

[56] References Cited

U.S. PATENT DOCUMENTS

| | | | |
|---|---|---|---|
| 4,284,052 | 8/1981 | Hanisko | 123/476 X |
| 4,365,602 | 12/1982 | Stiller et al. | 123/414 |
| 4,414,946 | 11/1983 | Däumer et al. | 123/414 X |
| 4,574,756 | 3/1986 | Ito et al. | 123/414 X |
| 4,615,318 | 10/1986 | Imoto et al. | 123/414 |
| 4,644,917 | 2/1987 | Yakuwa et al. | 123/414 |

FOREIGN PATENT DOCUMENTS 0226232  12/1984  Japan ...................... 123/414

Primary Examiner—Willis R. Wolfe
Attorney, Agent, or Firm—Max Fogiel

[57] ABSTRACT

To rapidly determine the position of the crankshaft of a four-cycle engine with an equal number n of cylinders in relation to its cylinders it is proposed that a signal generator attached to the crankshaft be divided along its circumference into n/2 equal signal-mark sections, each with one identification mark, and that a signal generator attached to the camshaft be divided into n/2 or n equal signal sections with equal graduations that differ from one another. The identification marks differ when the number of signal-mark sections differs and can be identical when the number of these sections is different. Comparison of the pulses from the two signal generators and synchronized by the indentification marks makes it possible to directly associate the position of the crankshaft with the cylinders even immediately after the engine starts.

23 Claims, 2 Drawing Sheets

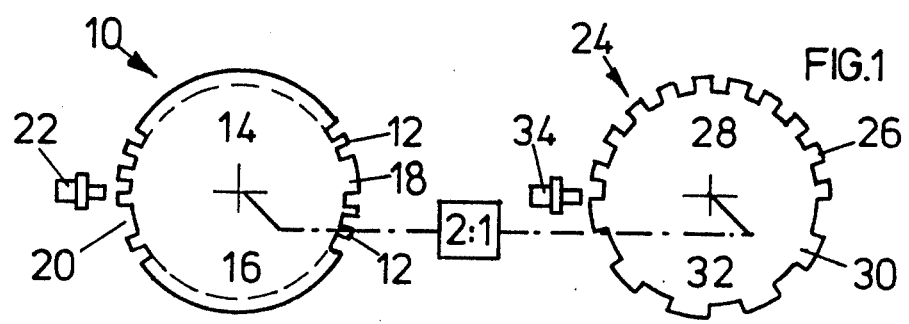
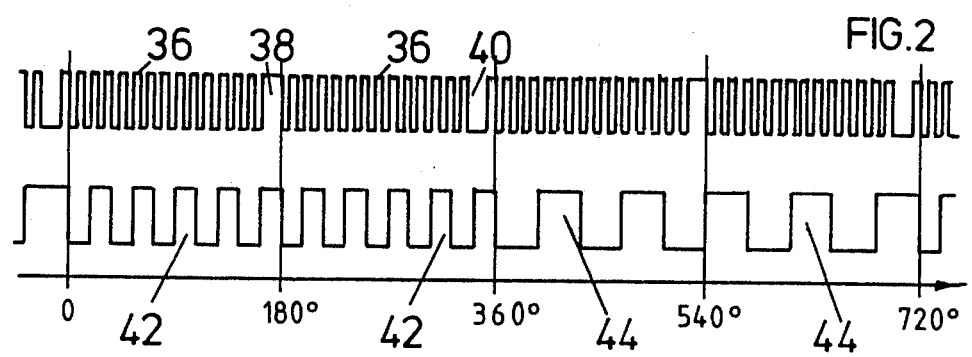
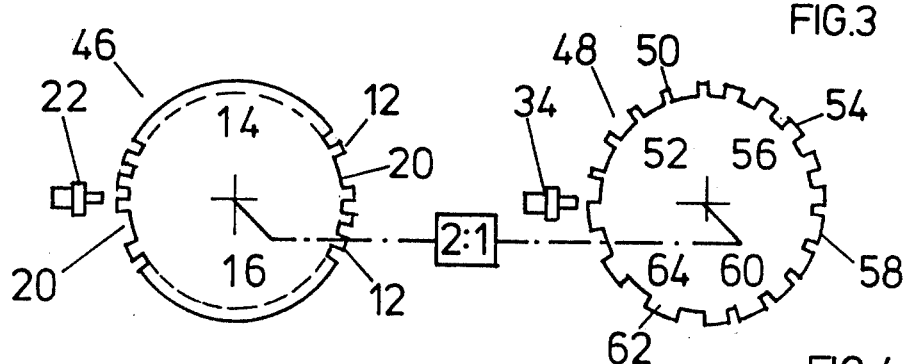
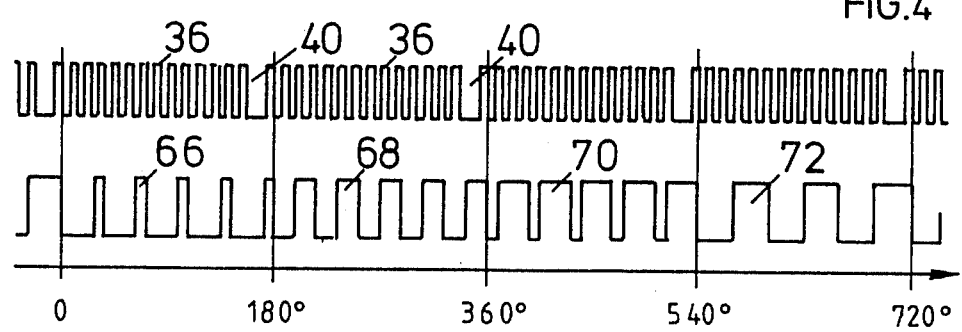

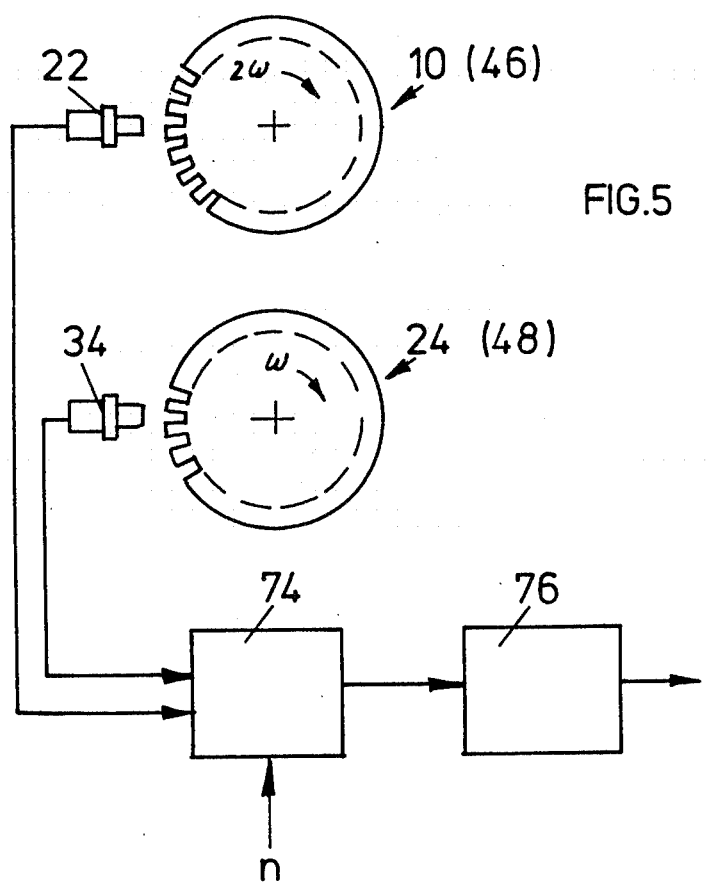

DEVICE FOR DETERMINING THE POSITION OF A CRANKSHAFT IN RELATION TO THE CYLINDER

DESCRIPTION

The invention concerns a device as in the preamble to claim 1.

It is impossible to obtain adequate information in any known way as to the correct ignition time or, in sequential-injection systems, as to the correct injection time for the individual cylinder from the position of the crankshaft in a four-cycle engine. This is because the complete operating cycle (intake-compression-combustion/power-exhaust) of a four-cycle engine extends over two complete crankshaft revolutions and accordingly 720° of crankshaft angle. With the engine on full, the separate operating cycles occur at an interval dictated by the number of existing cylinders (with the crankshaft angle 720° divided by 6 to obtain an interval of 120° for six cylinders and 720°/4=180° for four).

Contemporary engines with static high-voltage distribution demand that the instant of injection or ignition be released at the right time. This is necessary to make it possible to exploit not only the position of the crankshaft but also that of the camshaft to identify the position of the crankshaft in relation to the cylinder-operating cycle. In this context positioning signal generators in the form of cammed or toothed generator disks on both the crankshaft and the camshaft is known. These mechanisms travel past stationary, inductive for example, signal receivers as the shafts rotate and accordingly release pulsed signals. The generator disk on the crankshaft has a large number of teeth, 60 for example, around its circumference to ensure more precise determination of its position, whereas a single signal mark on the camshaft generator disk is sufficient to associate it with the operating cycle. This device, however, has a drawback in that the engine must turn two complete revolutions when starting up in the worst possible case before the camshaft generator can release a signal and supply identification of the crankshaft position in relation to the operating cycle. Thus, it is frequently possible to obtain only a delayed calculation and output of the correctly timed ignition- and injection-initiation pulse, prolonging the starting times.

The object of the present invention is accordingly to provide a device of the type recited in the preamble with simple means of ensuring immediate determination of the position of the crankshaft in relation to the cylinder at any time during operation.

A device of the type recited in the preamble is distinguished in how it attains the aforesaid object in accordance with the invention by the characteristics recited in the body of claim 1. Since the given divisions of the signal marks are known, the pulses from the signal marks in both the crankshaft and the camshaft sections can be compared at any rotation position, especially even while the engine is being started, whereby the difference in crankshaft signal-generator identification marks can also be taken into consideration if necessary, to provide precise definition of the position of the crankshaft in relation to the cylinder. It will only be necessary to take the identification marks into consideration in addition when the number of camshaft sections equals that of the crankshaft sections. Otherwise the individual identification marks will synchronize or establish for example the upper dead centers of the individual cylinders. The device in accordance with the invention accordingly allows extremely rapid detection of whatever cylinder is in the operating stroke and accordingly avoids long start-up phases leading up to the final determination of the instant of injection or ignition.

In a particularly simple embodiment of the invention, recited in claim 2, the signal marks and identification marks are both in the form of teeth and/or gashes of different width. This makes it possible to provide a single signal receiver or sensor for the crankshaft signal generator. If the signal marks and identification marks are of different types, several signal receivers must be employed, which would be undesirable for reasons of instrumentation and economy.

The identification marks on the crankshaft sections are preferably positioned on the same end of each as recited in claim 3. This simplifies synchronization of the injection or ignition times.

The identification marks on the crankshaft section in another embodiment, recited in claim 4, have about twice the circumferential width of the signal marks. This makes it possible to provide a large number of signal marks for precise determination of the position of the crankshaft and hence to allow precise and reliable identification of the position of the crankshaft in terms of the operating cycle.

The identification marks on the crankshaft signal generator in one practical embodiment, recited in claims 5 through 7 and intended for a four-cylinder engine, are diametrically opposite. The camshaft signal generator has, depending on the design of the crankshaft signal-generator identification marks, either two or four camshaft sections with either two or four different signal-mark graduations.

Embodiments of the invention intended for a four-cylinder engine will now be specified with reference to the drawings wherein FIG. 1 is a schematic view of one embodiment of a device in accordance with the invention, FIG. 2 is a pulse diagram associated with FIG. 1, FIG. 3 is a schematic view of another embodiment of a device in accordance with the invention, FIG. 4 is a pulse diagram associated with FIG. 3, and FIG. 5 is a schematic overall view of the device in accordance with the invention.

The crankshaft signal generator 10 illustrated in FIG. 1 is a generator disk driven by an unillustrated crankshaft. Uniformly distributed around the circumference of the disk are signal marks 12 in the form of teeth or cams. The generator disk is divided into two equal sectors 14 and 16. Associated with one end of each sector is an identification mark. The two identification marks are approximately diametrically opposite and in this case differently designed. Associated with sector 14 is an identification mark 18 in the form of a tooth 18, whereas an identification mark 20 in the form of a matching gap is associated with sector 16. Signal marks 18 and 20 have the same circumferential width and, to differentiate them from signal marks 12, are in the present case approximately twice as wide as the latter. Associated with the circumference of crankshaft signal generator 10 is a signal receiver 22, which can for example operate either inductively or optically and which generates electric pulses as the teeth or gashes pass it.

A camshaft signal generator 24 is also illustrated in FIG. 1 in the form of a toothed generator disk driven by an unillustrated camshaft. The crankshaft of a four-cycle engine rotates twice as rapidly as the camshaft. This situation is represented in FIG. 1 by the dot-and-dash line interrupted by a box representing the camshaft transmission ratio. The generator disk of camshaft signal generator 24 is, like that of crankshaft signal generator 10, divided into two equal sectors 28 and 32. Signal marks are distributed around the circumference of the generator disk. The signal marks 26 associated with sector 28 are uniformly distributed, and that distribution differs from the uniform distribution of the signal marks 30 associated with sector 32. Associated with the circumference of camshaft signal generator 24 is another signal receiver 34, which can be designed like signal receiver 22.

As the two generator disks rotate, the sensors or signal receivers 22 and 34 pick up the pulses illustrated in FIG. 2 at every two complete revolutions of the crankshaft, specifically at a crankshaft revolution of 720° and a camshaft revolution of 360°. The shorter pulses 36 of signal receiver 22 are based on the signal marks 12 on crankshaft signal generator 10. Identification marks 18 and 20 alternately generate relatively longer pulses 38 and pauses 40 at the end of each 180° of revolution. Sensor or signal receiver 34 on the other hand alternately generates pulses 42 based on signal marks 26 and pulses 44 based on signal marks 30 for every 360° of crankshaft revolution.

It will be obvious from FIG. 2 that it is possible to definitely associate a crankshaft position with the individual operating cycles of the cylinder within the separate 180° sections of crankshaft revolution. For this it is always initially necessary to determine whether pulses 42 or 44 are present. This can be done very simply by comparing pulses 42 or 44 with pulses 36. Two pulses 36 for every pulse 42 for example could indicate that the crankshaft revolution is the first revolution, whereas three pulses 36 per pulse 44 would indicate that the crankshaft is carrying out its second revolution. Further differentiation will result from identification marks 38 and 40. The presence of a pulse 38 indicates either the first or third half revolution of the crankshaft, whereas an interval 40 indicates either the second or fourth half revolution.

The embodiment illustrated in FIG. 3 differs relatively little from that illustrated in FIG. 1. A crankshaft signal generator that generally corresponds to the disk 10 illustrated in FIG. 1 has two almost diametrically opposite identification marks 20, which are in the form of gashes in the present case. The camshaft signal generator 48 on the other hand is in contrast to the one in FIG. 1 divided into four equal sectors 52, 56, 60, and 64, with each of which a signal mark 50, 54, 58, or 62 is associated. The graduations between the individual signal marks within each sector are equal. The graduations between the signal marks differ, however, from one sector to another.

FIG. 4 illustrates the pulses generated by the embodiment illustrated in FIG. 3. Thus, an interval 40 based on identification marks 20 follows the pulses 36 of signal receiver 22 based on signal marks 12 subsequent to each 120° revolution of the crankshaft in contrast to the situation represented by FIG. 2, wherein pulses 38 alternate with intervals 40. Signal receiver 34 on the other hand generates four different types of pulse 66, 68, 70, and 72 on the basis of signal marks 50, 54, 58, and 62 in consequence of camshaft signal generator 48 within the four half revolutions of the crankshaft or one complete revolution of the camshaft.

FIG. 4 also demonstrates that the crankshaft position in relation to the cylinder can be determined at any time. This can be done very simply by comparing pulses 66, 68, 70, and 72 with pulses 36. This makes it possible to take not only a quantitative pulse comparison but also the pulse-sensing ratio into consideration. It is in any case unnecessary with reference to FIG. 4 and in relation to the embodiment illustrated in FIG. 3 to exploit the pulses 40 associated with identification marks 20 for identification because the generator disk associated with camshaft signal generator 48 is already divided into a number of sectors that corresponds to the number of cylinders, with signal marks of varying graduations. Pulses 40 are employed only for synchronization.

The crankshaft signal generator 10 or 46 illustrated in FIG. 5 rotates at twice the angular velocity of camshaft signal generator 24 or 48. The pulse signals picked up by signal receivers 22 and 34 are supplied to a pulse-processing stage 74, which is also provided with the number n of cylinders in the engine. Pulse-processing stage 74 then, in conjunction with the parameters entered, determines the position of the crankshaft in relation to the cylinders, and the result is supplied to an appropriate ignition system or injector 76 that carries out the requisite further operations.

The device in accordance with the invention is not only extremely simple but also highly practical, because it allows rapid determination of the position of the crankshaft in relation to the operating cycle of the individual cylinders at any time. The engine can accordingly be controlled or regulated even directly after starting without the crankshaft first having to rotate twice in the worst possible case. The device can be modified in many ways within the scope of the present invention. Magnetic and/or optical marks that can be detected by appropriate signal receivers or sensors for instance can be provided instead of teeth or grooves on the generator disks. It is basically also possible to determine the position precisely by means of the camshaft generator disk alone if the number of its sectors equals the number of cylinders present. In that case it is completely unnecessary to take the pulses from the crankshaft signal generator into consideration if the reference points for the individual cylinders can also be derived with sufficient precision from the camshaft signal-generator pulses. This would be possible with reference to FIG. 4 for example if the reference points were located at points where various types of pulse 66, 68, 70, and 72 follow one another. In another possible variant the identification marks would differ in accordance with the type and position of the signal marks. This embodiment would necessitate additional signal receivers for the identification marks. The additional expense would be justifiable if an especially high resolution of the angular position at all points by means of a continuous distribution of signal marks over the generator disk were desirable.

I claim:

1. An arrangement for determining in relation to an operating cycle of individual cylinders the position of a crankshaft of a four-cycle engine with an even number n of cylinders for releasing at the correct time an engine activating process, comprising: a first signal generator rotating with said crankshaft; a second signal generator rotating with a camshaft, each signal generator comprising a toothed generator disk secured to the respective shaft rotating with the respective signal generator shaft for generating pulses in relation to angular position for providing said generators with signal marks; stationary signal receivers associated with said generator disks; a pulse-processing stage connected to said receivers and associating each position of the crankshaft with said cylinders; said first signal generator rotating with said crankshaft having evenly-graduated signal marks into n/2 equal crankshaft sections, an identification mark identifying an upper cylinder dead center and being differentiable from said signal marks, said identification mark being associated with each crankshaft section; said second signal generator rotating with said camshaft having a circumference divided into equal camshaft sections that are definitely associated with said crankshaft sections and have equal signal-mark graduations that differ from each other; the identification marks on said crankshaft sections being different when the number of crankshaft and camshaft sections is equal and can be identical when the number is unequal; a pulse-processing stage synchronized by the pulses from said identification marks and associating the position of the crankshaft with said cylinders by comparing instantaneous pulses of both the crankshaft and camshaft sections, said pulse-processing stage associating the position of the crankshaft with said cylinders also dependent on a difference between pulses from particular associated identification marks when the number of said crankshaft and camshaft sections is equal.

2. An arrangement as defined in claim 1, wherein said engine activating process comprises an ignition process.

3. An arrangement as defined in claim 1, wherein said engine activating process comprises an injection process.

4. An arrangement as defined in claim 2, wherein said equal camshaft sections are divided into n/2 sections.

5. An arrangement as defined in cliam 2, wherein said equal camshaft sections are divided into n sections.

6. An arrangement as defined in claim 3, wherein said equal camshaft sections are divided into n/2 sections.

7. An arrangement as defined in claim 3, wherein said equal camshaft sections are divided into n sections.

8. An arrangement as defined in claim 1, wherein both said signal marks and identification marks on said first signal generator are in form of teeth of different circumferential width.

9. An arrangement as defined in claim 1, wherein both said signal marks and said identification marks on said first signal generator comprise gashes of different circumferential width.

10. An arrangement as defined in claim 1, wherein said identification marks on said crankshaft sections are on the same end thereof.

11. An arrangement as defined in claim 8, wherein said identification marks on said crankshaft sections are on the same end thereof.

12. An arrangement as defined in claim 9, wherein said identification marks on said crankshaft sections are on the same end thereof.

13. An arrangement as defined in claim 1, wherein said identification marks on said crankshaft sections have a circumferential width of substantially twice that of their signal marks.

14. An arrangement as defined in claim 8, wherein said identification marks on said crankshaft sections have a circumferential width of substantially twice that of their signal marks.

15. An arrangement as defined in claim 9, wherein said identification marks on said crankshaft sections have a circumferential width of substantially twice that of their signal marks.

16. An arrangement as defined in claim 1, wherein two identification marks on a total of two equal crankshaft sections are located diametrically opposite for a four-cylinder engine.

17. An arrangement as defined in claim 8, wherein two identification marks on a total of two equal crankshaft sections are located diametrically opposite for a four-cylinder engine.

18. An arrangement as defined in claim 9, wherein two identification marks on a total of two equal crankshaft sections are located diametrically opposite for a four-cylinder engine.

19. An arrangement as defined in claim 16, wherein four equal camshaft sections with signal marks with four different graduations are present.

20. An arrangement as defined in claim 19, wherein said two identification marks comprise teeth.

21. An arrangement as defined in claim 19, wherein said two identification marks comprise gashes.

22. An arrangment as defined in claim 16, wherein one of said two identification marks comprises a tooth and the other identification mark comprises a gash and a total of two equal camshaft sections with signal marks of two different graduations are present.

23. An arrangement as defined in claim 1, wherein the signal marks and the identification marks on said first signal generator comprise teeth and gashes of different circumfernetial width.

* * * * *